United States Patent [19]
Probst et al.

[11] Patent Number: 5,468,257
[45] Date of Patent: Nov. 21, 1995

[54] PROCESS FOR DYING LEATHER WITH PIGMENTS AND CATIONIC BINDERS

[75] Inventors: Joachim Probst, Leverkusen; Fritz Novotny, Bergisch Gladbach; Harro Träubel; Ludger Heiliger, both of Leverkusen, all of Germany

[73] Assignee: Bayer Aktiengesellschaft, Leverkusen, Germany

[21] Appl. No.: 169,567

[22] Filed: Dec. 17, 1993

[30] Foreign Application Priority Data

Dec. 24, 1992 [DE] Germany ............ 42 44 006.8

[51] Int. Cl.$^6$ ........................... D06P 3/32
[52] U.S. Cl. ............ 8/436; 8/404; 8/552; 8/555; 8/637.1
[58] Field of Search .............. 8/404, 436, 552, 8/554, 555, 637.1, 94.1 R; 427/389

[56] References Cited

U.S. PATENT DOCUMENTS

| | | | |
|---|---|---|---|
| 3,139,321 | 6/1964 | Clapp | 8/555 |
| 3,744,969 | 7/1973 | Alps et al. | 8/94.21 |
| 3,765,924 | 10/1973 | Craven | 117/63 |
| 4,190,687 | 2/1980 | Sugiura et al. | 8/94.1 R |
| 4,199,643 | 4/1980 | Falgiatore et al. | 8/115.6 |
| 4,314,800 | 2/1982 | Monsheimer et al. | 8/94.1 R |
| 4,325,862 | 4/1982 | Schuster | 524/87 |
| 4,417,013 | 11/1983 | Schuster | 524/87 |
| 4,581,034 | 4/1986 | Eckert et al. | 8/94.1 R |
| 4,596,581 | 6/1986 | Höhr et al. | 8/94.21 |
| 4,914,764 | 4/1990 | Mast et al. | 8/436 |
| 4,983,185 | 1/1991 | Streicher et al. | 8/436 |
| 5,007,941 | 4/1991 | Martinelli et al. | 8/436 |
| 5,190,586 | 3/1993 | Mizuguchi et al. | 106/499 |
| 5,221,284 | 6/1993 | Meister et al. | 8/94.1 R |

FOREIGN PATENT DOCUMENTS

| | | |
|---|---|---|
| 0022746 | 1/1981 | European Pat. Off. . |
| 3730781 | 3/1989 | Germany . |

OTHER PUBLICATIONS

*Advances in Polymer Science*, vol. 62, 1984; "Free Radical Polymerisation. The Synthesis of Graft Copolymers", T. Corner, pp. 95–142.

*Journal of Polymer Science*, vol. 27, pp. 1099–1114, 1989, "Water–Soluble Graft Copolymers from Macromonomer Method", Y. Tsukahara et al.

*Journal of Polymer Science*, vol. 19, pp. 879–889, 1981; "Catalyzed Chain Transfer to Monomer in Free Radical Polymerization", N. S. Enikolopyan et al.

*J. Macromol. Sci.–chem.*, vol. A26 (8), pp. 1137–1149, 1989; "Catalytic Chain–Transfer in Polymerization of Methyl Methacrylate . . . ", R. A. Sanayei et al.

*Polymer Science USSR*, vol. 31, No. 10, pp. 2369–2376, 1989; "Features of the Radical Polymerization of Styrene and Methacrylates . . . ", AA Gridnev.

"Dispersion Polymerization in Organic Media", KEJ Barrett, 1975, Imperial Chemical Industries Ltd, 3 pages, Table of Contents only.

"Ring–Opening Polymerization", RH Young, Mar., 1977, ACS Symposium Series, 5 pages; Table of Contents only.

Abstract Database WPI/Derwent, AN 92–394171, JP–A–4293058; "Forming Image Single Component Develop Charge Control", Ricoh KK; Oct. 16, 1992, Week 9248.

Abstract Database WPI/Derwent, AN 91–320582, JP–A–3213136; "Disperse Inorganic Organic Pigment Comprise Polyvinyl . . . ", Toa Gosei Chem.; Sep. 18, 1991, Week 9144.

Abstract Database WPI/Derwent, AN 91–242343, JP–A–3157466; "White Aqueous Ink Composition Writing Material Contain . . . ", Dainichiseika Color Chem; Jul. 5, 1991, Week 9133.

Abstract Database WPI/Derwent, AN 90–063685, JP–A–2017155; "Di Alkyl Aminoalkyl Acrylate Preparation . . . ", Toa Gosei Chem; Jan. 22, 1990, Week 9009.

Abstract Database WPI/Derwent, AN 78–20849A, JP–A–50113536; "Water Based Coating Composition PVC Leather", Honny Chemicals; Sep. 5, 1975, Week 7811.

*Primary Examiner*—Paul Lieberman
*Assistant Examiner*—Caroline L. Dusheck
*Attorney, Agent, or Firm*—William C. Gerstenzang; Sprung Horn Kramer & Woods

[57] ABSTRACT

Specific cationic polymers having hydrophobic side chains are highly suitable as binders for pigments for the dyeing of leather.

5 Claims, No Drawings

PROCESS FOR DYING LEATHER WITH PIGMENTS AND CATIONIC BINDERS

The invention relates to cationic pigment binders which can be used in aqueous systems for the pigmenting of leather.

The dyeing of leather with dyestuffs often results in defects, such as, for example, poor light fastness or unsatisfactory dyeing of grains. The use of pigments for the pigmenting of leather often gives non-uniform pigmenting: The pigments are preferentially deposited on the flesh side and on open grain damages of the leather. The pores (at the roots of the hair) often remain undyed. However, for many types of leathers, for example upholstery leather, garment leather or special shoe upper leathers, complete penetration is required.

In this context, it is of importance that the pigment dispersion be sufficiently stable for enabling uniform distribution of the pigments in and on the leather; if, in contrast, upon contact of the dispersion with the leather surface the pigment precipitates, the pigment distribution obtained is, viewed over the leather cross section, unsatisfactory. Moreover, an excessively high pigment concentration on the leather surface leads to reduced adhesion of the finish.

EP-A 344,555 discloses a process for the pigmenting of leather with pigments from an aqueous liquor in the presence of an alkoxylated polyamine containing at least 20 C atoms. The alkoxylated polyamines recommended in EP-A 344,555 are difficult to fix on leather and thus end up in part in the wastewater together with the wash liquors.

A process for the pigmenting of leather with the pigments from an aqueous liquor has now been found which is superior to the hitherto known dyeing processes. The essential feature of this process is that a cationic polymer containing neutralised tertiary amino groups and/or quaternary ammonium groups is used as pigment binder.

Accordingly, the invention provides for the use of cationic polymers obtainable by polymerisation of a) 5 to 60, preferably 10 to 50, % by weight of N,N-$C_1$–$C_4$-dialkylamino-$C_1$–$C_6$-alkyl acrylate and/or N,N-$C_1$–$C_4$-dialkylamino-$C_1$–$C_6$-alkyl methacrylate and/or N,N-$C_1$–$C_4$-dialkylamino-$C_1$–$C_6$-alkylacryl- and/or -methacrylamides, such as, for example, N,N-dimethylaminoethyl (meth)acrylate, N,N-diethylaminoethyl (meth)acrylate, N,N-dimethylaminopropyl (meth)acrylamide, b) 0 to 90, preferably 5 to 60, % by weight of ethylenically unsaturated compounds which are free of amino and ammonium groups and whose homopolymers (at a number average molecular weight of at least 10,000) possess glass-transition temperatures of at least 90° C., such as, for example, methyl methacrylate and/or acrylo- and/or methacrylonitrile and/or styrene and/or α-methylstyrene and/or p-methylstyrene and/or p-chlorostyrene, c) 0 to 70, preferably 0 to 50, % by weight of ethylenically unsaturated compounds which are free of amino and ammonium groups and whose homopolymers (at a number average molecular weight of at least 10,000) possess glass-transition temperatures below 90° C., preferably below 50° C., such as, for example, $C_1$–$C_{22}$-alkyl acrylates and/or $C_1$–$C_{22}$-alkyl methacrylates with the exception of methyl methacrylate, and d) 0 to 40, preferably 3 to 30, % by weight of monoethylenically unsaturated compounds which are free of amino and ammonium groups and have an average molecular weight (number average) of 400 to 6,000 and a water solubility below 1 g/l at 25° C., the percentages given being based on the sum of components a) to d), followed by neutralisation and/or quaternisation, as pigment binders.

Particularly preferably used polymers are those obtainable from

I. 10 to 60, preferably 10 to 50, % by weight of component a) and 40 to 90, preferably 50 to 90, % by weight of component b), or II. 5 to 60, preferably 10 to 50, % by weight of component a), 5 to 70, preferably 10 to component b) and to 40, % by weight of 5 to 50, preferably 5 component c), monomers c) containing at least 8 C atoms in the alcohol radical, or III. 5 to 60, preferably 10 to 50, % by weight of component a), 10 to 70, preferably 10 to 60, % by weight of component b) and 3 to 30 % by weight of component d).

The amino groups of monomers a), after being neutralised or quaternised in the finished polymer, make it water-dispersible. If less than 10% by weight of these components, relative to total monomers, is used, aqueous dispersions having a relatively small amount of polymer dissolved in the form of a molecular dispersion are obtained. Higher proportions of component a) lead to increasing amounts of polymer dissolved in the form of a molecular dispersion until, at proportions of more than about 25% by weight, the amounts of polymer dissolved in the form of a colloid dispersion finally disappear altogether.

Monomers b) make the polymer rigid, while monomers c) make it flexible.

Compounds d) contain 1 terminal C=C double bond per molecule. Polymers containing radicals of compounds c) and d) incorporated therein are particularly preferred. The combination of a hydrophilic chain backbone and hydrophobic side chains results in surfactant-like properties which upon copolymerisation of compounds d) are transferred therefrom to the polymer to be used according to the invention.

Several methods are available for preparing compounds d), for example 1. free-radical polymerisation of vinyl monomers, such as, for example, styrene, acrylates, methacrylates, and the like, in the presence of mercapto-$C_2$–$C_6$-carboxylic acid, preferably α-mercaptoacetic acid, as chain transfer agent, followed by reaction of the resulting terminal carboxyl groups with compounds containing both a reactive epoxy group and an ethylenically unsaturated group, such as, for example, glycidyl acrylate, glycidyl methacrylate or allyl glycidyl ether (references: T. Corner, Adv. Polym. Sci. 62, p. 95–142 (1984) and Y. Tsukahara et al., J. Polym. Sci. Part A: Polym. Chem. 27, p. 1,099–1,114 (1989));

2. free-radical polymerisation of $C_1$–$C_6$-alkyl methacrylates in the presence of cobalt complexes, preferably of diacetyl dioximes or based on porphin, as regenerable chain-transfer agents (references: N. S. Enikolopyan et al., J. Polym. Sci., Polym. Chem. Ed. 19, p. 879–889 (1981); R. A. Sanayei and K. F. O'Driscoll, J. Macromol. Sci. Chem. A26 (8), p. 1,137–1,149 (1989) and A. A. Gridnev, Polymer Sci. USSR 31 (10) p. 2,369–2,376 (1989));

3. cationic polyaddition of 6-caprolactone in the presence of hydroxyl-containing ethylenically unsaturated compounds, preferably hydroxy-$C_2$–$C_3$-alkyl acrylate and hydroxy-$C_2$–$C_3$-alkyl methacrylate, by means of catalysts (preferably sulphonic acids, such as p-toluenesulphonic acid, methanesulphonic acid, and the like) (references: R. H. Young, M. Matzner, C. A. Pilato: "Ring-Opening Polymerizations: Mechanism of Polymerization of ϵ-Caprolacton"

Chap. 11 "Ring-Opening Polymerization", T. Saegusa and E. Goethals (Ed.), Am. Chem. Soc., Washington, D.C., 1977);

4. polycondensation of hydroxy-$C_6$–$C_{24}$-carboxylic acids (for example 12-hydroxystearic acid), reaction of the terminal hydroxyl groups with $C_1$–$C_{24}$-carboxylic acids, followed by reaction of the terminal carboxyl groups with compounds containing both a reactive epoxy group and an ethylenically unsaturated group, such as, for example, glycidyl acrylate, glycidyl methacrylate or allyl glycidyl ether (references: K. E. J. Barrett, Dispersion Polymerization in Organic Media (1975), J. Wiley & Sons, London, New York, Sydney, Toronto).

The polymers can be prepared by polymerisation of compounds a) to c) or d) by customary methods, in particular by bulk, solution, aqueous emulsion or suspension polymerisation initiated by free radicals.

The polymers are preferably prepared in organic solution. Continuous and batchwise polymerisation methods are possible. Of the batchwise methods, the batch method and, preferably, the feed stream addition method may be mentioned. In the feed stream addition method, the organic solvent is introduced by itself or together with a portion of the monomer mixture as the initial charge, heated to the polymerisation temperature, polymerisation is started by free radicals in the case of a monomer as the initial charge, and the remaining monomer mixture or the entire monomer mixture together with an initiator mixture is metered in over a period of 1 to 10 hours, preferably 2 to 6 hours. If necessary, the mixture is then reactivated in order to take the polymerisation to a conversion of at least 99%.

In this procedure, it is often advantageous to introduce a larger portion of compound d) as the initial charge, since its reactivity may be reduced owing to steric hindrance or incompatibility with the growing polymer chain. Examples of suitable organic solvents are aromatics, such as benzene, toluene, xylene, chlorobenzene, esters, such as ethyl acetate, butyl acetate, methylglycol acetate, ethylglycol acetate, methoxypropyl acetate, ethoxypropyl acetate, propylene glycol diacetate, ethers, such as butylglycol, tetrahydrofuran, dioxane, ethylglycol ether, ketones, such as acetone, methyl ethyl ketone, methyl isobutyl ketone, halogenoalkanes, such as methylene chloride or trichloromonofluoroethane.

The polymerisation initiated by free radicals can be started by initiators whose free-radical half-lives at 80° to 180° C. are between 0.01 and 400 minutes. In general, the reaction is carried out in the temperature range mentioned, preferably between 100° and 160° C., under a pressure of 1 to 20 bar, the exact polymerisation temperature depending on the type of initiator.

The initiators can be used in amounts of 0.05 to 6% by weight, relative to the total amount of monomers. Examples of preferred initiators are aliphatic azo compounds, such as azoisobutyronitrile, and peroxides, such as, for example, dibenzoyl peroxide, t-butyl perpivalate, t-butyl 2-ethyl perhexanoate, t-butyl perbenzoate, t-butyl hydroperoxide, di-t-butyl peroxide, cumene hydroperoxide and dicyclohexyl peroxydicarbonate and dibenzyl peroxydicarbonate.

For regulating the molecular weight of the polymers, customary regulators can be used, such as, for example, n-dodecylmercaptan, t-dodecylmercaptan, diisopropyl xanthogen disulphide, di(methylenetrimethylolpropane) xanthogen disulphide and thioglycol. They can be added in a maximum amount of 3% by weight, relative to the total amount of monomer. After polymerisation is complete, the polymers are converted into an aqueous solution or dispersion. To this end, the organic polymer solution is introduced into a water phase which in most cases is preheated and at the same time the organic solvent is removed by distillation, in general under reduced pressure. In order to achieve good water solubility or dispersibility, a neutralising agent, such as, for example, an inorganic or organic acid, can be added to the water phase. Examples of inorganic acids are hydrochloric acid, sulphuric acid, nitric acid and phosphoric acid. Examples of organic acids are formic acid, acetic acid, lactic acid, fumaric acid, maleic acid, tartaric acid, oxalic acid. Formic acid and acetic acid are particularly preferred.

Quaternisation can be effected by means of quaternising agents either in the organic phase or in the aqueous phase. Examples of suitable quaternising agents are (ar)alkyl halides, sulphuric esters, epihalogenohydrins and monoepoxides, in particular methyl chloride, methyl iodide, dimethyl sulphate, benzyl chloride, ethyl chloroacetate, bromoacetamide, propylene oxide, 1,2-butylene oxide and epichlorohydrin and epibromohydrin. If quaternisation is incomplete, the remaining amino groups are neutralised with additional acid, and the polymer is dissolved or dispersed in water. The polymers are used in the form of 10 to 50, preferably 15 to 40% strength by weight aqueous solutions and/or dispersions which in general exhibit a viscosity of 10 to $10^5$, preferably 20 to 10,000 mPa.s/23° C. and a pH of 2 to 8, preferably 4 to 6.

The pigments can easily be dispersed within a very short period of time by means of the polymers to be used according to the invention by mixing the components, for example, by means of a dissolver, a rotor/stator mill, a bead mill or ball mill. The particle size of the milled pigments and the colour yield are very good.

There is virtually no limitation on the pigments which can be incorporated in the polymers to be used according to the invention; they can be of inorganic or organic nature. Suitable organic pigments include, for example, those of the azo, anthraquinone, azoporphin, thioindigo, dioxazine, naphthalenetetracarboxylic acid or perylenetetracarboxylic acid series, phthalocyanines and sulpho- and/or carboxyl-containing calcium, magnesium or aluminium lakes of a large number of which are disclosed, for example, in Colour Index, 2nd Edition. Suitable inorganic pigments include, for example, zinc sulphides, titanium dioxides, ultramarine, iron oxides, nickel compounds and chromium compounds and carbon black. Cadmium sulphide, lead chromate or other pigments which are less suitable because of their environmental properties could of course also be used. In principle, precipitated dyestuffs are also suitable. Prior to their treatment with pigments, the leathers can be predyed with dyestuffs or, after the pigment treatment, crossdyed with pigments and dyestuffs.

Pigment preparations containing the polymers to be used according to the invention can be used for the dyeing not only of wet blues but also of crust leathers and retanned leathers. The polymer serves as carrier for the pigment and as fixing agent, thus making the use of foreign fixing agents unnecessary. The efficient dispersing action of the polymers to be used according to the invention also enables a joint use of pigments of different densities.

Colouring with pigments dispersed in the polymers to be used according to the invention can, for example, be effected in the following manner:

Wet blue, retanned or wetted-back crust is brought to a pH of about 4 (advantageously in 200 to 400% by weight of water at 35° to 45° C.). Depending on the desired colour strength, 0.1 to 20% by weight (preferably 0.5 to 8% by weight) of pigment and polymer is then added, and the leather is drummed for 30 to 60 minutes. After a few minutes, the liquor starts to become clear; after 30 minutes at the latest, a clear residual liquor and level dyed leathers are obtained which additionally can be crossdyed. The individual dyeings of wet blue (which term also includes chrome velour) and crust are as follows:

Wet Blue

After a short washing period, pigment and polymer are added in a new liquor at a temperature of 20° to 60° C., preferably 30° to 50° C., and a pH of 3.5 to 4.5. After a running time of 30 to 60 minutes, 1 to 3% by weight of commercially available chrome tanning agent is added in the form of a powder and drumming of the leather is continued for 30 to 60 minutes. The liquor is then virtually clear. The leather is then neutralised, re-tanned, possibly crossdyed and fat-liquored, and dried by conventional methods.

Crust Leather

After customary wetting-back, the leather is thoroughly rinsed. 0.5 to 2% by weight of an anionic commercially available fat-liquoring agent is added in a new bath at a temperature of 30° to 60° C., followed by drumming for 30 to 60 minutes. The pH is then lowered to 3.5 to 4.5 by means of formic acid. Before adding pigment and polymer, a treatment with 0.5 to 2% by weight of a cationic auxiliary for 5 to 15 minutes has proved to be particularly advantageous. Pigment and polymer are then added, and drumming is continued for another 30 to 60 minutes. The liquor is then virtually clear. If desired, the leather is then acidified and rinsed.

It is in principle possible to use the pigment preparations according to the invention for the dyeing of leathers which have been tanned by means of vegetable tanning agents; however, the dyeing method has to be adapted to the vegetable leather type.

The leather is removed from the liquor and finished in a manner customary for this type of operation. Additional dyeing with soluble anionic dyestuffs before or after pigmentation is possible.

The physical fastness properties, such as perspiration fastness, light and migration fastness, are excellent. The process achieves very good hiding of the defects on the rawhide which are usually natural in origin or produced as a result of preservation.

Examples 1 to 13 describe the preparation of the polymer, Examples P1 to P17 that of the pigment preparations and A1 to A4 describe the applications.

The percentages given in the examples which follow are by weight; ratios are by weight.

EXAMPLES

Starting Materials

Compound d1)

1,140 g (10 mol) of ε-caprolactone and 65 g (0.56 mol) of distilled hydroxyethyl methacrylate are introduced into a 2-1 flask as the initial charge and stabilised with 200 ppm of ionol. 1.2 g (0.1% by weight) of p-toluene-sulphonic acid (containing 1 mol of water of crystallisation) are added to this mixture, and polymerisation is carried out at 50° C. for 22 hours. The course of the reaction can be monitored by means of the refractive index. The reaction is then stopped with 6.3 ml of a 1N sodium methoxide solution, and the reaction mixture is poured onto a metal sheet to give a white, wax-like product.

Compound d2)

11 g of stearic acid, 209 g of 12-hydroxystearic acid and 50 g of xylene are introduced as the initial charge, nitrogen is then passed over this solution, and the mixture is heated to 100° C. It is stirred until a homogeneous solution has been formed. A solution of 0.15 g of titanium tetrabutoxide in 5 g of xylene is then added, and 17 ml of water of reaction are removed via a water separator by increasing the reaction temperature to about 190° C. The evaporated polyester sample has a molecular weight Mn of 1,200 g×mol$^{-1}$, an OH number of 1.5 mg of KOH/g and an acid number of 43 mg of KOH/g. 200 g of the polyester thus obtained are heated to 50° C. and combined with 17.4 g of glycidyl methacrylate, 300 mg of hydroquinone and 0.3 g of N,N-dimethylaminododecane in 40 g of xylene. The mixture is then heated to 100° C. and stirred for 22 hours. After this time, the acid number has dropped to 4.9 mg of KOH/g. Xylene is removed by distillation until a final concentration of about 75% is reached. The solution is cooled off and filtered. Concentration of the solution: 75.8%.

Compound d3)

250 g of n-butyl methacrylate are poured into a 500 ml three-neck flask, 50 mg of 5, 10, 15, 20-tetrakis(4-methoxyphenyl)-21H,23H-porphine cobalt (II) complex are added, the flask is evacuated three times and aerated with nitrogen. It is then heated to 80° C. and upon reaching this temperature 1 g of azoisobutyronitrile is added, and the mixture is stirred at 80° C. for about 10 hours. The crude solution is freed from residual monomers at 70° C. in a high vacuum (0.1 mbar). The molecular weight Mn determined by $^1$H NMR end group analysis is about 5,500 g mol$^{-1}$.

Example 1

10,075 g of methyl isobutyl ketone are introduced into a 40-1 autoclave as the initial charge. The autoclave is thoroughly flushed with nitrogen and then heated to 75° C. At this temperature, a mixture of 4,187 g of N,N-dimethylaminoethyl methacrylate, 7,406 g of styrene and 4,508 g of acrylonitrile and a solution of 378 g of azoisobutyronitrile in 3,978 g of methyl isobutyl ketone are metered in over a period of 6 hours with the exclusion of air. The mixture is then additionally stirred for 1 hour and reactivated with a solution of 45 g of azoisobutyronitrile in 567 g of methyl isobutyl ketone. It is then stirred at 75° C. for about 8 hours. After polymerisation is complete, 1,435 g of acetic acid are metered in. 1,155 g of propylene oxide are then metered in over a period of about 15 minutes, and the mixture is stirred for about 1 hour. After this period, a further 1,739 g of acetic acid are added.

About 63–1 of deionised water are introduced into a 120-1 autoclave as the initial charge and heated to about 60° C. The contents of the 40-1 autoclave are then added to the aqueous initial charge and dissolved therein with stirring. The solvent methyl isobutyl ketone is then distilled off at reduced pressure.

The concentration of the aqueous dispersion is 24.0% by weight, the pH is 4.2 and the viscosity measured at 23° C. is 100 to 150 mPa.s (the aqueous dispersion is a non-Newtonian fluid!).

Examples 2 to 7

200 g of methyl isobutyl ketone (I in Table 1) are introduced into a 2-1 stirred flask equipped with gas inlet and outlet as the initial charge, nitrogen is then passed over the liquid, and the contents are heated to 70° C. Monomer mixtures II (see Table 1) and initiator solution III are simultaneously metered to the initial charge over a period of 3 hours. The mixture is then stirred for 2 hours and reactivated with initiator solution IV. Stirring is continued for 10 hours, and the mixture is then neutralised with V.

2,000 g of deionised water (VI) are then introduced into a 4-1 flask as the initial charge, heated to 60° C. to 70° C., and the contents of the 2-1 flask are combined therewith. The organic solvent is distilled off under reduced pressure (about 200 mbar). The physicochemical data of the polymer solutions are listed in Table 1.

TABLE 1

| Examples | 2 | 3 | 4 | 5 | 6 | 7 |
|---|---|---|---|---|---|---|
| I. Initial charge | | | | | | |
| Methyl isobutyl ketone: | 200 g | → | → | → | → | → |
| II. Monomer mixture: | | | | | | |
| N,N-dimethylamino-ethyl methacrylate: | 150 g | 200 g | 150 g | 200 g | 225 g | 250 g |
| Styrene: | 165 g | 135 g | 135 g | 105 g | 120 g | 105 g |
| Acrylonitrile: | 110 g | 90 g | 90 g | 70 g | 80 g | 70 g |
| Compound d1): | 75 g | 75 g | 125 g | 125 g | 75 g | 75 g |
| III. Initiator solution: | | | | | | |
| Azoisobutyronitrile: | 12.5 g | → | → | → | → | → |
| Methyl isobutyl ketone: | 250 g | → | → | → | → | → |
| IV. Reactivator solution: | | | | | | |
| Azoisobutyronitrile: | 2.5 g | → | → | → | → | → |
| Methyl isobutyl ketone: | 50 g | → | → | → | → | → |
| V. Neutralising agent: | | | | | | |
| Acetic acid: | 60 g | 80 g | 100 g | 120 g | 90 g | 100 g |
| VI. Deionised water: | 2000 g | → | → | → | → | → |
| Concentration: | 23.6% | 29.8% | 25.0% | 20.7% | 29.4% | 23.0 % |
| pH: | 5.0 | 5.1 | 4.7 | 5.1 | 5.6 | 5.5 |
| Viscosity at 23° C. (mPa · s): | <50 | 760 | <50 | 890 | 6330 | 6100 |

Examples 8 and 9

200 g of methyl isobutyl ketone (I in Table 2) are introduced into a 2-1 stirred flask equipped with gas inlet and outlet as the initial charge, nitrogen is then passed over the liquid, and the contents are heated to 70° C. Monomer mixtures II (see Table 2) and initiator solution III are simultaneously metered to the initial charge over a period of 2 hours. The mixture is then stirred for 2 hours and reactivated with initiator solution IV. Stirring is continued for 10 hours, and the mixture is then neutralised with V.

2,000 g of deionised water (VI) are then introduced into a 4-1 flask as the initial charge, heated to 60° C. to 70° C., and the contents of the 2-1 flask are combined therewith. The organic solvent is distilled off azeotropically under reduced pressure (about 200 mbar). The physicochemical data of the polymer solutions are listed in Table 2.

TABLE 2

| Examples | 8 | 9 |
|---|---|---|
| I. Initial charge | | |
| Methyl isobutyl ketone: | 200 g | 200 g |
| II. Monomer mixture: | | |
| N,N-dimethylaminoethyl methacrylate: | 150 g | 150 g |
| Styrene: | 135 g | 165 g |
| Acrylonitrile: | 90 g | 110 g |
| Compound d2): | 125 g | 75 g |
| III. Initiator solution: | | |
| Azoisobutyronitrile: | 12.5 g | 12.5 g |
| Methyl isobutyl ketone: | 250 g | 250 g |
| IV. Reactivator solution: | | |
| Azoisobutyronitrile: | 2.5 g | 2.5 g |
| Methyl isobutyl ketone: | 50 g | 50 g |
| V. Neutralising agent: | | |
| Acetic acid: | 100 g | 100 g |
| VI. Deionised water: | 2000 g | 2000 g |
| Concentration: | 19.8% | 24.0% |
| pH: | 4.8 | 4.8 |
| Viscosity at 23° C. (mPa · s): | <50 | 250 |

Examples 10 and 11

Solution I (see Table 3) is introduced into a 1-1 stirred flask equipped with gas inlet and outlet as the initial charge, flushed with nitrogen, and heated to 70° C. Solution II is then metered in over a period of 3 hours, and the mixture is additionally stirred for 2 hours.

The ketone solution is then metered dropwise to mixture IV and mixed therewith until a homogeneous mixture is obtained. Methyl isobutyl ketone is then distilled off (at temperatures of up to 100° C.) azeotropically at reduced pressure. The cloudy, aqueous solution is then cooled and filtered. The physicochemical data are listed in Table 3.

TABLE 3

| Examples | 10 | 11 |
|---|---|---|
| I. Initial charge | | |
| Methyl isobutyl ketone: | 100 g | 100 g |
| Compound d3): | 37.5 g | 62.5 g |
| II. Monomer mixture: | | |
| N,N-dimethylaminoethyl methacrylate: | 100 g | 100 g |
| Styrene: | 67.5 g | 52.5 g |
| Acrylonitrile: | 45 g | 35 g |
| Methyl isobutyl ketone: | 125 g | 125 g |
| Azoisobutyronitrile: | 6.25 g | 6.25 g |
| III. Reactivator solution: | | |
| Azoisobutyronitrile: | 1.25 g | 1.25 g |
| Methyl isobutyl ketone: | 25 g | 25 g |
| IV. Solution of the neutralising agent: | | |
| Acetic acid: | 40 g | 60 g |
| Deionised water: | 1000 g | 1000 g |
| Concentration: | 20.6% | 20.5% |
| pH: | 5.3 | 4.5 |

Examples 12 and 13

Solvent I (see Table 4) is introduced into a 2-1 stirred flask equipped with gas inlet and outlet as the initial charge, flushed with nitrogen, and heated to 70° C. Monomer mixture II and initiator solution III are then evenly and simultaneously metered in over a period of 2 hours, and the mixture is additionally stirred for 2 hours.

It is then reactivated with initiator solution IV. Stirring is continued for 10 hours, and neutralising agent V is then added. The organic polymer solution is then metered dropwise to water phase VI and mixed therewith until a homogeneous mixture is obtained. The organic solvent is then distilled off azeotropically at reduced pressure. The slightly cloudy, aqueous solution is then cooled and filtered. The physicochemical data of the aqueous polymer solutions are also listed in Table 4.

TABLE 4

| Examples | 12 | 13 |
|---|---|---|
| I. Initial charge | | |
| Methyl isobutyl ketone: | 200 g | — |
| Toluene | — | 200 g |
| II. Monomer mixture: | | |
| N,N-dimethylaminoethyl methacrylate: | 150 g | 150 g |
| Technical grade mixture of stearyl methacrylate and hexadecyl methacrylate: | 150 g | 150 g |
| Styrene: | 120 g | 100 g |
| Acrylonitrile: | 80 g | 100 g |

TABLE 4-continued

| Examples | 12 | 13 |
|---|---|---|
| III. Initiator solution: | | |
| Azoisobutyronitrile: | 12.5 g | 12.5 g |
| Methyl isobutyl ketone: | 50 g | — |
| Toluene: | — | 50 g |
| IV. Reactivator solution: | | |
| Azoisobutyronitrile: | 2.5 g | 2.5 g |
| Methyl isobutyl ketone: | 50 g | — |
| Toluene: | — | 50 g |
| V. Neutralising agent: | | |
| Acetic acid: | 100 g | 100 g |
| VI. Deionised water: | 2000 g | 2000 g |
| Concentration: | 25.9% | 25.2% |
| pH: | 4.7 | 4.7 |
| Viscosity at RT (mPa · s): | <100 | <100 |

Comparative Examples C1 and C2

Solvent I (see Table 5) is introduced into a 2-1 stirred flask equipped with gas inlet and outlet as the initial charge, flushed with nitrogen, and heated to 70° C. Monomer mixture II and initiator solution III are then evenly and simultaneously metered in over a period of 2 hours, and the mixture is additionally stirred for 2 hours.

It is then reactivated with initiator solution IV. Stirring is continued for 10 hours, and neutralising agent V is then added. The organic polymer solution is then metered dropwise to water phase VI and mixed therewith until a homogeneous mixture is obtained. The organic solvent is then distilled off azeotropically at reduced pressure. The somewhat cloudy, aqueous solution is then cooled and filtered. The physicochemical data of the aqueous polymer solutions are also listed in Table 5.

TABLE 5

| Comparative Examples | C1 | C2 |
|---|---|---|
| I. Initial charge | | |
| Methyl isobutyl ketone: | 200 g | 200 g |
| II. Monomer mixture: | | |
| N,N-dimethylaminoethyl methacrylate: | 325 g | 350 g |
| Styrene: | 175 g | 150 g |
| III. Initiator solution: | | |
| Azoisobutyronitrile: | 12.5 g | 12.5 g |
| Methyl isobutyl ketone: | 250 g | 250 g |
| IV. Reactivator solution: | | |
| Azoisobutyronitrile: | 2.5 g | 2.5 g |
| Methyl isobutyl ketone: | 50 g | 50 g |
| V. Neutralising agent: | | |
| Acetic acid: | 186 g | 201 g |
| VI. Deionised water: | 2000 g | 2000 g |
| Concentration: | 21.0% | 20.2% |
| pH: | 4.9 | 4.9 |
| Viscosity at RT (mPa · s): | <50 | <50 |

Production of the pigment preparations
Auxiliaries used:

Shellsol TD is an aliphatic hydrocarbon mixture (b.p. 170–190° C.) (Deutsche Shell Chemie

TABLE 5-continued

| | |
|---|---|
| Elftex 415 | GmbH, D-6236 Eschenbach). carbon black pigment (Cabot GmbH, D-6450 Hanau). |
| CHROMOSAL B | 33% strength basic chromium sulphate (Bayer AG, LEV) |
| Lipsol ES | fat-liquoring agent (Schill & Seilacher, Böblingen). |
| Coripol MB | anionic fat-liquoring agent (Stockhausen, Krefeld) |
| RETINGAN R4B-N | resinous tanning agent (Bayer AG). |
| BAYMOL A | mixture of nonionic emulsifiers (Bayer AG). |
| BLANCOROL RL | chromium sulphate/syntan mixture having neutralising properties (Bayer AG) |

TABLE 5-continued

| | |
|---|---|
| LEVOTAN K | 55% strength aqueous oligourethane solution (Bayer AG) |
| Tetrapol SAF | fat-liquoring agent (Stockhausen, Krefeld) |
| Agitan 295 | antifoam (Münzing Chemie GmbH, Heilbronn) |
| Preventol R 50 | benzyldodecyldimethylammonium chloride, 50% strength in water (Bayer AG) |

Example P 1

400 g of the dispersion prepared according to Example 1 are introduced into a vessel as the initial charge. 100 g of dipropylene glycol, 30 g of a cationic product serving as disinfectant (benzyldodecyldimethylammoniumchloride), 200 g of Pigment Brown 25 and 15 g of ˚Shellsol TD and 255 g of water are added to the aqueous dispersion. The mixture is dispersed for 15 minutes using a dissolver at about 8000 rpm, and the dispersion thus prepared is transferred to a bead mill (ball diameter 1.5 mm). After 15 minutes, the mixture is poured off to give an evenly dispersed pigment preparation which when brush-coated onto leather does not show "comets" or other unlevelness.

The pigment preparations listed in Table 1 were produced analogously to Example P 1.

TABLE 1

Pigment preparations; variation of the binders

| | Binder | | Pigment mixture (g) consisting of PigmBrown 45: 46 parts PigmViolet 23: 5 parts PigmYellow 13: 46 parts $^R$Elftex 415: 3 parts | Shellsol TD | Cation emuls. |
|---|---|---|---|---|---|
| Ex. | according to Ex. | Amount [g] | | Amount [g] | Amount [g] |
| P 2 | 2 | 400 | 200 | 10 | 30 |
| P 3 | 3 | 310 | 200 | 10 | 30 |
| P 4 | 4 | 370 | 200 | 10 | 30 |
| P 5 | 5 | 430 | 200 | 10 | 30 |
| P 6 | 6 | 480 | 200 | 10 | 25 |
| P 7 | 7 | 600 | 200 | 10 | 25 |
| P 8 | 8 | 465 | 200 | 10 | 30 |
| P 9 | 9 | 383 | 200 | 10 | 30 |
| P 10 | 10 | 450 | 175 | 20 | 25 |
| P 11 | 11 | 450 | 175 | 20 | 25 |
| P 12 | 1 | 450 | 200 | 20 | 25 |

| | Water-dilutable high-boiling solvent | | Water | Thickener | Antifoam | Evaluation |
|---|---|---|---|---|---|---|
| Ex. | Type | Amount [g] | Amount [g] | Amount [g] | Amount [g] | of the dyeing on leather |
| P 2 | Polyglycol P400 | 100 | 250 | 8 | 2 | relat. level |
| P 3 | Polyglycol P400 | 100 | 343 | 5 | 2 | level |
| P 4 | Polyglycol P400 | 100 | 280 | 8 | 2 | relat. level |
| P 5 | Polyglycol P400 | 100 | 220 | 8 | 2 | very level |
| P 6 | Polyglycol P400 | 100 | 185 | — | — | relat. level |
| P 7 | Polyglycol P400 | 100 | 65 | — | — | very level |
| P 8 | Dipropylene glycol | 100 | 193 | — | 2 | level |
| P 9 | Dipropylene glycol | 100 | 275 | — | 2 | relat. level |
| P 10 | Polyglycol P400 | 100 | 222 | 5 | 3 | level |
| P 11 | Polyglycol P400 | 100 | 224 | 3 | 3 | level |
| P 12 | Polyglycol P400 | 100 | 224 | 3 | 3 | see Ex. A4 |

Examples P 13 to P 17

The pigment preparations listed in Table 2 were produced analogously to Examples P 1 to P 12 under comparable conditions. The good to excellent levelness and colour depth of the preparations based on the pigment binders according to the invention upon application to leather can be seen from this table. In contrast thereto, the pigment preparations based on Comparative Examples 1 and 2 are clearly less suitable.

TABLE 2

Pigment preparations; comparison with preparations not according to the invention

| Ex. | Binder according to Ex. | Binder Amount | Pigment ®Elftex; Amount (g) | Shellsol TD Amount (g) | Cation. emulsifier Amount (g) | Polyglycol P 400 Amount (g) | Water Amount (g) | Antifoam ® Agitan 295, Amount (g) | Evaluation of the dyeing on leather |
|---|---|---|---|---|---|---|---|---|---|
| P13 | 8  | 248 | 125 | 5 | 15 | 50 | 110 | 1-2 | level |
| P14 | 12 | 193 | 125 | 5 | 15 | 50 | 115 | 1-2 | very level |
| P15 | 13 | 197 | 125 | 5 | 15 | 50 | 110 | 1-2 | very level |
| P16 | C 1 | 238 | 125 | 5 | 15 | 50 | 70 | 1-2 | unlevel |
| P17 | C 2 | 248 | 125 | 5 | 15 | 50 | 60 | 1-2 | unlevel |

USE EXAMPLES

Example A 1: Dyeings of a Wet Blue

A wet blue suitable for furniture nappa (containing 2.8% of $Cr_2O_3$), shaved thickness 1.1 mm is washed at 40° C. with 300% of water (pH 4.5). 200% of water at 40° C. is then added again, the pH is brought to 4 with formic acid (diluted 1:10), and, after 20 minutes, 2% of the pigment preparation P 1 (diluted 1:5) are added. After 60 minutes, 2% of a 33% strength basic chromium sulphate (˚CHROMOSAL B from Bayer AG) are added; this is followed by a 30-minute run, after which neutralisation and retanning by the customary procedure are started. In a modified procedure, a uniformly dyed wet blue was crossdyed during retanning with 3% of Acid Orange 51 by known methods.

Not only the leather dyed exclusively with pigment but also the leather crossdyed with a dyestuff were very well penetrated, natural leather defects were accidentally hidden, and the entire colour was very uniform.

Example A 2

Example A 1 was repeated, using 1% of pigment. After only 30 minutes, the addition of chrome tanning agent took place.

Although the leather colour in this case was uniform but somewhat less strong, the leather cross-section was not very well penetrated.

Example A 3: Dyeing of a Crust Leather

A commercially retanned crust leather of shaved thickness 1.4 mm is wetted back in 1000% of water at 40° C. with 2% of ammonia (diluted 1:10) and after 10 minutes with 2% of an emulsifying fat-liquoring agent (˚Lipsol ES) for 120 minutes. The liquor is discharged, the leather is rinsed, and 600% of water at 40° C. is added. 2% of an anionic fat-liquoring agent (˚CORIPOL MB) and, after a further 30 to 60 minutes, 1 to 2% of formic acid (diluted 1:10) are added. At this point, the liquor should have a pH of 4. Then 1% of a resinous tanning agent (˚Retingan R4 B-N) is added, and, after a running time of 10 minutes, 2.5% of a pigment (diluted 1:5 with water) according to Example P10 are added. (After a running time of about 40 minutes, the liquor can be acidified to a pH of 3.8 to 4 with 0.5% of formic acid (diluted 1:10); however, this acidification is in general omitted.) The leather is then dried and finished in the customary manner.

The leathers obtained have been uniformly dyed; they have excellent water-drop fastness, light fastness and migration stability.

Example A 4: Dyeing of a Velour Leather 5 wet blue splits (thickness 1.7 mm) were washed in a drum with 300% of water (50° C.) and 0.5% of BAYMOL A for 30 minutes, and the liquor was discharged.

50% of water (50° C.) and 0.5% of formic acid (which previously had been diluted with water in a weight ratio of 1:10 ) was added, and after a running time of 5 minutes, 4% of pigment P12 (Experiment A) was added. After 90 minutes, 2% of CHROMOSAL B, after 15 minutes 2% of BLANCOROL RC, after 30 minutes 4% of LEVOTAN K and after another 60 minutes 1% of sodium formate were added. The pH of the liquor is 4.1.

The leather is then washed with water at 40° C. for 10 minutes. 100% of water (40° C.) containing 2.2% of sodium bicarbonate are brought in (pH=6.4), after 40 minutes 7% of CORIPOL MB are added together with 0.5% of TETRAPOL SAF, followed by a running time of 60 minutes (pH=6.0). The liquor is discharged.

In Experiment B, 4% of pigment as above and, after 60 minutes, 2% of CORIPOL MB are added. After 30 minutes, the leather is rinsed with warm water at 20° C. for 5 minutes.

The leathers are placed on the horse, predried at 70° C. in vacuo (3 minutes) and finally completely dried on a suspender. After air-conditioning, they are staked, buffed and freed from dust.

Leather A was dark-brown; leather B was black.

The leathers were tested for light fastness (DIN [German Standards Specification]53,343=IUF 402). They were exposable to light to above 4 on the blue scale (Acid Blue 121) without impairment. The perspiration fastness (IUF 426) and the migration stability (IUF 442) were excellent.

In a further experiment (C), leather A was crossdyed after fat-liquoring, with 3% of Acid Black 210 and finished in a customary manner.

We claim:

1. In the process of dyeing leather, prior to finishing, with an aqueous dye liquor comprising a pigment and a pigment binder, the improvement wherein said leather is dyed with an aqueous dye liquor in which the binder is a binder prepared by the polymerization of a) 5 to 60% by weight of a member of the group consisting of N,N-$C_1$–$C_4$-dialkylamino-$C_1$–$C_6$-alkyl acrylate, N,N-$C_1$–$C_4$-dialkylamino-$C_1$–$C_6$-alkylacrylamides, N,N-$C_1$–$C_4$-dialkylamino-$C_1$–$C_6$-methacrylamides, and mixtures thereof, b) 0 to 90% by weight of a member of the group consisting of methyl methacrylate, acrylonitrile, methacrylonitrile, styrene, α-methylstyrene, p-methylstyrene, p-chlorostyrene and mixtures thereof, c) 0 to 70% by weight of a member of the group consisting of $C_1$–$C_{22}$-alkyl acrylates, $C_1$–$C_{22}$-alkyl methacrylates, and mixtures thereof, with the exception of methyl methacrylate, and d) 0 to 40% by weight of monoethylenically unsaturated compounds which are free of amino and ammonium groups and have an average molecular weight (number average) of 400 to 6,000 and a water solubility below 1 g/l at 25° C., the percentages given being based on the sum of components a) to d), followed by neutralization, quaternization or both.

2. The process according to claim 1, wherein the binders are obtained by polymerisation of 10% to 50% by weight of a), 5% to 60% by weight of b), 0% to 50% by weight of c), and 3% to 30% by weight of d).

3. The process according to claim 1, wherein the binders are obtained by polymerisation of 10 to 60% by weight of a) and 40 to 90% by weight of b).

4. The process of claim 1, wherein said polymerization is a polymerization of 5 to 60% by weight of a), 5 to 70% by weight of b), and 5 to 50% by weight of c), monomers c) containing $C_8$–$C_{22}$-alkyl acrylates or $C_8$–$C_{22}$-alkyl methacrylates.

5. The process according to claim 1, wherein the binders are obtained by polymerisation of 5 to 60% by weight of a), 10 to 70% by weight of b), and 3 to 30% by weight of d).

* * * * *

UNITED STATES PATENT AND TRADEMARK OFFICE
CERTIFICATE OF CORRECTION

PATENT NO. : 5,468,257
DATED : November 21, 1995
INVENTOR(S) : Probst, et al.

It is certified that error appears in the above-indentified patent and that said Letters Patent is hereby corrected as shown below:

Title Page & Col. 1   Title [54] Line 1 delete " DYING "
line 1                and substitute -- DYEING --

Signed and Sealed this

Twenty-third Day of April, 1996

Attest:

BRUCE LEHMAN

Attesting Officer    Commissioner of Patents and Trademarks